(12) United States Patent
Alvar

(10) Patent No.: US 7,269,908 B1
(45) Date of Patent: Sep. 18, 2007

(54) TOOL FOR PROJECTING A VISUALLY PERCEPTIBLE PLUMB LINE FROM A PROPOSED LOCATION OF A FIRE SPRINKLER HEAD ON A SUSPENDED CEILING AND METHOD OF USING

(76) Inventor: Ryan Alvar, 8297 County View Dr., Pine City, MN (US) 55063

( * ) Notice: Subject to any disclaimer, the term of this patent is extended or adjusted under 35 U.S.C. 154(b) by 195 days.

(21) Appl. No.: 11/116,481

(22) Filed: Apr. 28, 2005

(51) Int. Cl.
G01C 15/00 (2006.01)
(52) U.S. Cl. .............................. 33/286; 33/228; 33/529
(58) Field of Classification Search ................. 33/227, 33/228, 282, 283, 286, 291, 370, 371, 404, 33/529, 533, 644, 809, DIG. 21; 169/16; 248/343; 40/617
See application file for complete search history.

(56) References Cited

U.S. PATENT DOCUMENTS

| | | | | |
|---|---|---|---|---|
| 2,431,101 | A * | 11/1947 | Woods | 269/69 |
| 4,566,200 | A * | 1/1986 | Brady et al. | 33/809 |
| 4,614,043 | A * | 9/1986 | Nagano et al. | 33/529 |
| 4,689,888 | A * | 9/1987 | Aldrich et al. | 33/288 |
| 4,703,563 | A * | 11/1987 | Hoshino et al. | 33/227 |
| 4,724,647 | A * | 2/1988 | Baird | 52/127.2 |
| 4,834,186 | A * | 5/1989 | Ballard | 169/16 |
| 5,390,422 | A * | 2/1995 | Hill | 33/412 |
| 5,979,068 | A | 11/1999 | Andrews | |
| 6,124,935 | A * | 9/2000 | Matthews | 356/399 |
| 6,247,238 | B1 | 6/2001 | Harvey et al. | |
| 6,393,708 | B1 * | 5/2002 | Culver et al. | 33/397 |
| 6,488,097 | B1 * | 12/2002 | MacDonald et al. | 169/43 |
| 6,554,231 | B2 * | 4/2003 | Choi | 248/65 |
| 6,601,309 | B1 * | 8/2003 | Hedstrom | 33/286 |

\* cited by examiner

Primary Examiner—R. Alexander Smith
(74) Attorney, Agent, or Firm—Sherrill Law Offices, PLLC

(57) ABSTRACT

A tool for projecting a visually perceptible plumb line extending from a proposed location of a fire sprinkler head on a suspended ceiling. The tool includes a base and a self-leveling laser. The base is configured and arranged to supportably engage the support beams of an installed suspended ceiling grid system so as to support the tool when placed within a panel-retention frame of the installed grid system. The self-leveling laser is repositionably mounted on the base with a vertically extending laser beam which is plumb when the laser is level.

13 Claims, 5 Drawing Sheets

US 7,269,908 B1

TOOL FOR PROJECTING A VISUALLY PERCEPTIBLE PLUMB LINE FROM A PROPOSED LOCATION OF A FIRE SPRINKLER HEAD ON A SUSPENDED CEILING AND METHOD OF USING

FIELD OF INVENTION

The invention relates to hand-tools, specifically hand-tools used in the installation of fire sprinkler systems.

BACKGROUND

Fire sprinkler systems are commonly installed in commercial, industrial and high-density housing complexes for purposes of detecting and extinguishing any fire which may occur within the building before the fire can spread. Typical fire sprinkler systems include main pipes anchored to the ceiling joists. Horizontal branch lines, also anchored to the ceiling joists, extend from the main pipes to the desired location of each fire sprinkler head. A vertical length of pipe is attached to the free end of each horizontal branch line using a 90° elbow and a fire sprinkler head is attached to the lower end of the vertical pipe.

In many instances a suspended ceiling is also installed in the building to conceal the ceiling joists, ductwork, electrical wiring, plumbing, etc. in order to provide an attractive finished appearance to the space. In such cases, the fire sprinkler heads must be mounted below the ceiling panels. While placement of the fire sprinkler heads is limited to some extent by the need to ensure proper coverage for each room in the building, the aesthetics of a suspended ceiling can be improved by providing uniform placement of the fire sprinkler heads along the diagonal line of the ceiling panels in a uniform pattern throughout the room, as opposed to a haphazard random placement of the fire sprinkler heads.

One of the major challenges facing those who install fire sprinkler systems is determining the exact placement and length of the horizontal branch lines necessary to precisely position the fire sprinkler heads on the ceiling panels due to the significant vertical offset between the horizontal plane in which the horizontal branch line is installed and the horizontal plane in which the suspended ceiling is installed. While several makeshift methods have been adopted and employed over the years, ranging from trial and error to use of a stick to project the desired location of the fire sprinkler head on the ceiling panels into the horizontal plane in which the horizontal branch line is to be installed so as to permit measurement from a main pipe to a point directly above the desired location of the fire sprinkler head.

While generally effective for locating the sprinkler heads, such methods are cumbersome, time consuming and often require additional manpower.

Accordingly, a substantial need exists for a quick, easy and inexpensive method for determining the length, placement and configuration of horizontal branch lines in order to achieve precise positioning of fire sprinkler heads on a suspended ceiling.

SUMMARY OF THE INVENTION

A first aspect of the invention is a tool for projecting a visually perceptible plumb line extending from a proposed location of a fire sprinkler head on a suspended ceiling. The tool includes a base and a self-leveling laser. The base is configured and arranged to supportably engage the support beams of an installed suspended ceiling grid system so as to support the tool when placed within a panel-retention frame of the installed grid system. The self-leveling laser is repositionably mounted on the base with a vertically extending laser beam which is plumb when the laser is level.

A second aspect of the invention is a method for installing fire sprinkler heads in a suspended ceiling. The method includes the steps of (i) obtaining the tool described above, (ii) identifying at least one panel-retention frame in an installed grid system where a fire sprinkler head is to be located, (iii) resting the tool within the identified panel-retention frame, (iv) positioning the laser on the base at the desired horizontal location for the fire sprinkler head, (v) projecting a plumb laser beam upward from the positioned laser, (vi) measuring horizontal distance from an attachment point on a previously installed overhead piping system to the laser beam, (vii) creating a piping assembly configured and arranged to horizontally extend from the attachment point from which the measurement was taken to a position immediately over the desired location for the fire sprinkler head, (viii) connecting a first end of the piping assembly to the previously installed overhead piping system at the attachment point from which the measurement was taken, (ix) removing the tool from within the identified panel-retention frame, and (x) connecting a second end of the piping assembly to a length of piping configured and arranged to extend plumb from the second end of the piping assembly to a fire sprinkler head positioned below a ceiling panel installed within the identified panel-retention frame.

BRIEF DESCRIPTION OF THE DRAWINGS

FIG. 1 is a side view of one embodiment of the invention with the laser turned on.

DETAILED DESCRIPTION OF THE INVENTION INCLUDING A BEST MODE

Figure 1:
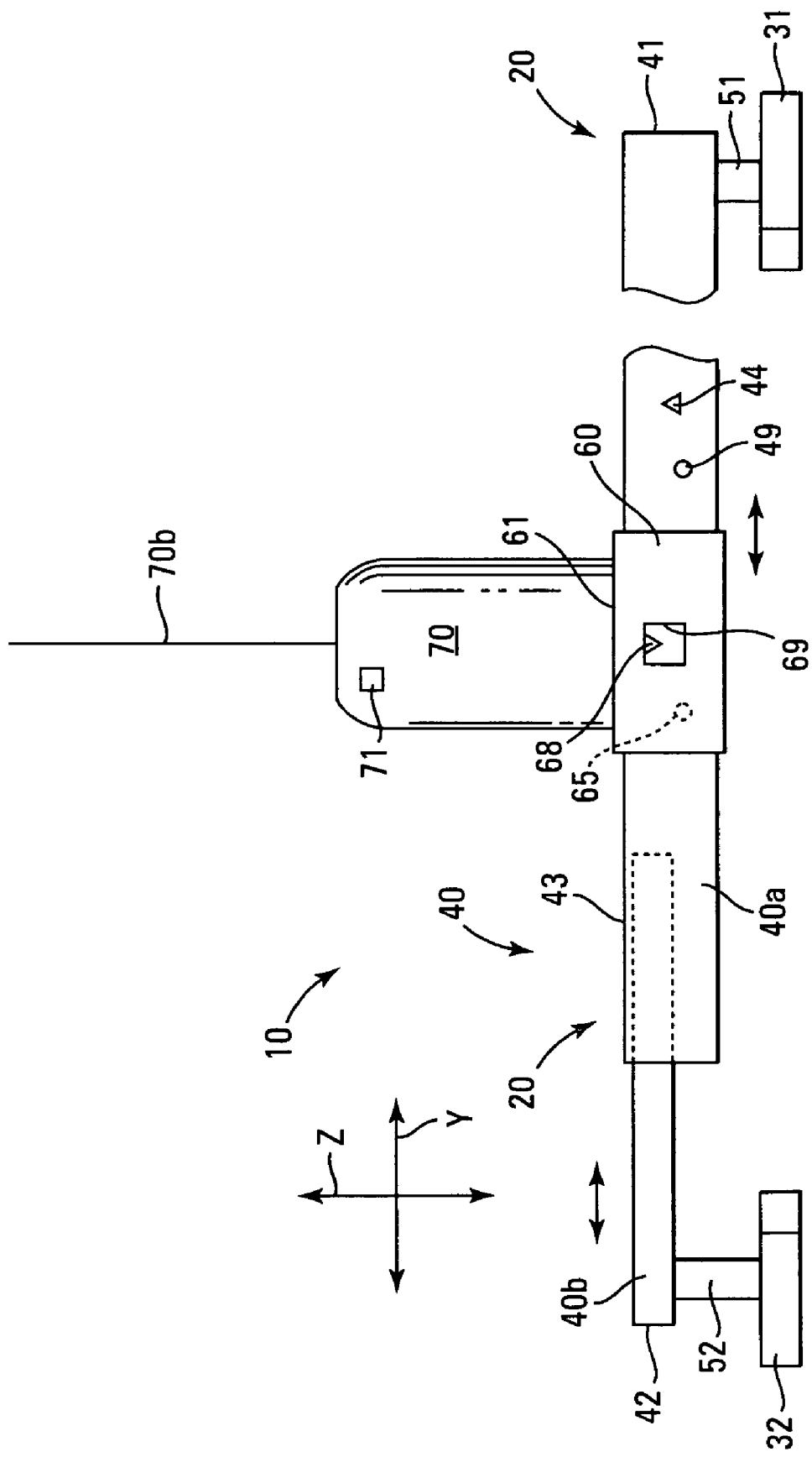
Figure 2:
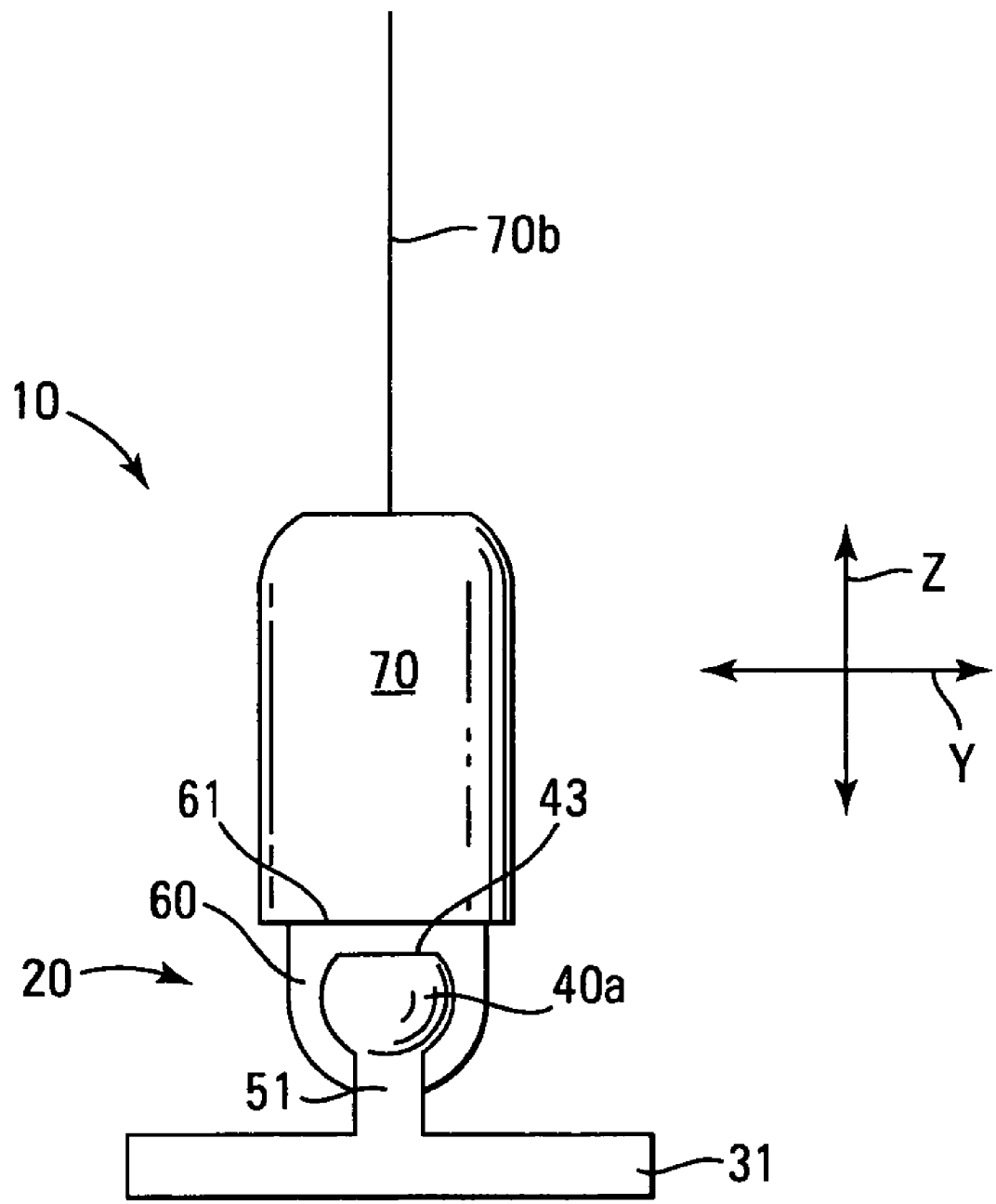
FIG. 2 is an end view of the invention shown in FIG. 1.
Figure 3:
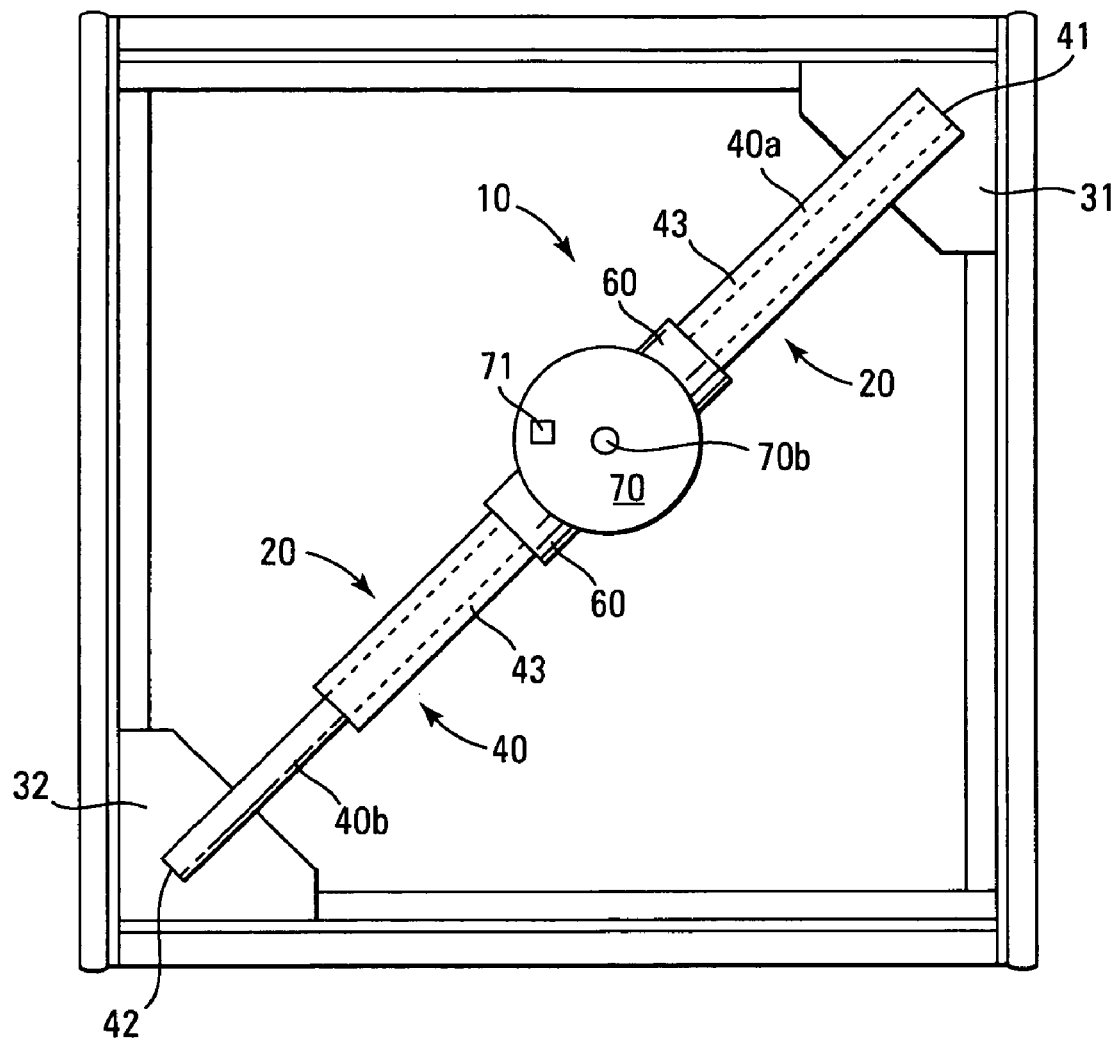
FIG. 3 is a top view of the invention shown in FIG. 1 operably positioned within a rectangular panel-retention frame of a suspended ceiling grid system.
Figure 4:
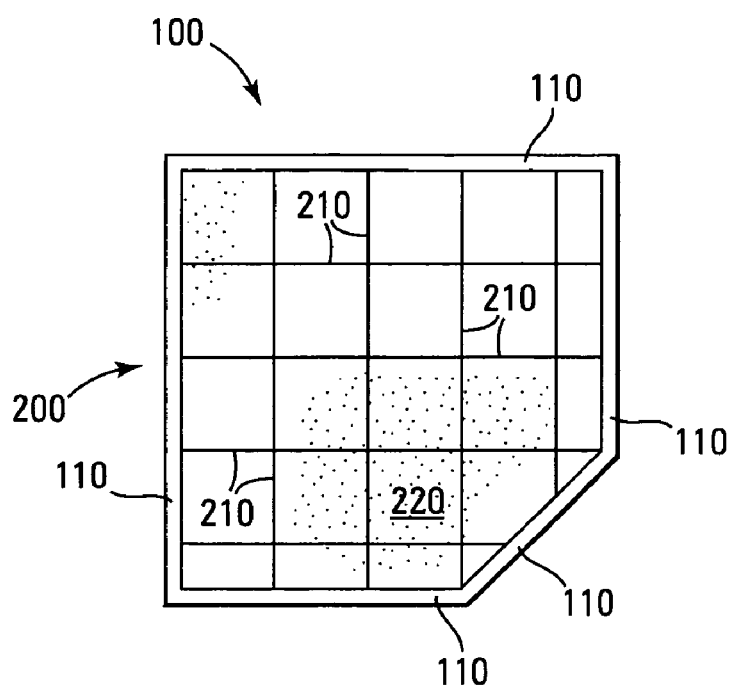
FIG. 4 is a top view of one embodiment of a suspended ceiling grid system in a room with several ceiling panels installed within the grid system.
Figure 5:
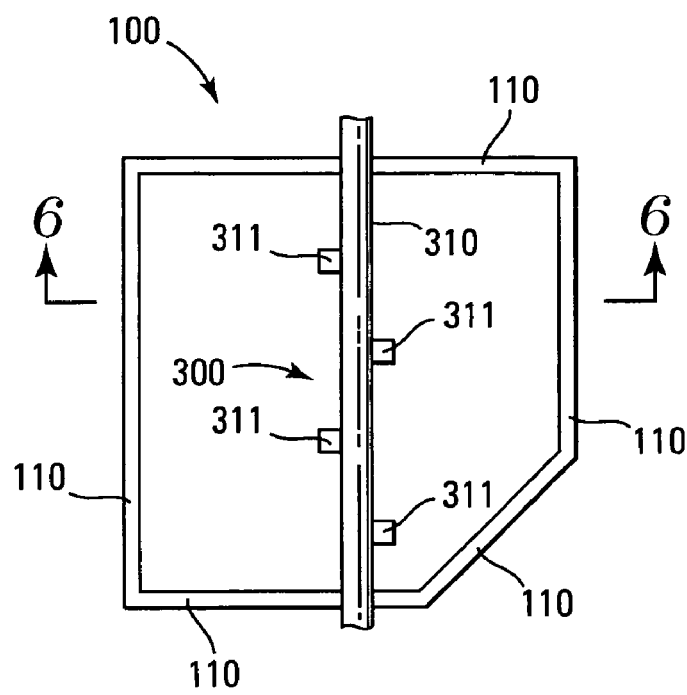
FIG. 5 is a top view of one embodiment of a main pipe of a fire sprinkler system passing through the room depicted in FIG. 4.

| Nomenclature | |
|---|---|
| 10 | Tool |
| 20 | Base |
| 31 | First Foot |
| 32 | Second Foot |
| 40 | Guideway |
| 40a | First Section of Guideway |
| 40b | Second Section of Guideway |
| 41 | First Longitudinal End of Guideway |
| 42 | Second Longitudinal End of Guideway |
| 43 | Upper Surface of First Section of Guideway |
| 44 | Centering Marking on Guideway |
| 49 | Dimple |
| 51 | First Post |
| 52 | Second Post |
| 60 | Mounting Sleeve |
| 61 | Upper Surface of the Mounting Sleeve |
| 65 | Detent |
| 68 | Alignment Indicator on the Mounting Sleeve |

-continued

Nomenclature

| | |
|---|---|
| 69 | Side Window in the Mounting Sleeve |
| 70 | Self-Leveling Laser |
| 70b | Laser Beam |
| 71 | Power Switch |
| 100 | Room |
| 110 | Walls |
| 120 | Ceiling Joists |
| 200 | Suspended Ceiling |
| 210 | Support Beams |
| 220 | Ceiling Panels |
| 230 | Hangers |
| 300 | Fire Sprinkler System |
| 310 | Main Pipe |
| 311 | T-Joint |
| 320 | Piping Assembly |
| 321 | Horizontal Length of Pipe |
| 322 | 90° Elbow |
| 330 | Vertical Length of Pipe |
| 340 | Fire Sprinkler Head |
| 350 | Hangers |
| H | Horizontal |
| V | Vertical |
| x | Longitudinal Length |
| y | Lateral Width |
| z | Transverse Depth |

Definitions

As utilized herein, including the claims, the phrase "piping assembly" means one or more lengths of pipe and any associated fittings. Piping assembly encompasses a single straight piece of pipe.

Construction

As shown in FIGS. 1-3 and 7, a first aspect of the invention is a tool 10 for projecting a plumb laser beam 70b upward from the desired location of a fire sprinkler head 340 on a suspended ceiling 200 for purposes of facilitating horizontal measurement from an attachment point 311 on a previously installed overhead piping system 300 to a position immediately over the desired location of the fire sprinkler head 340.

The tool 10 includes a base 20 and a self-leveling laser 70. The base 20 is configured and arranged to support the self-leveling laser 70 within an otherwise empty panel-retention frame (unnumbered) of an installed suspended ceiling grid system (unnumbered). The base 20 includes a telescoping guideway 40 having a first section 40a and a second section 40b. A first foot 31 is attached to the first longitudinal end 41 of the guideway 40 by a first post 51. A second foot 32 is attached to the second longitudinal end 42 of the guideway 40 by a second post 52. The first foot 31 and second foot 32 are configured and arranged to supportably engage a panel-retention frame within an installed suspended ceiling grid system whereby the guideway 40 extends along the diagonal (unnumbered) of the panel-retention frame. In a preferred embodiment, the first and second feet 31 and 32 engage the diagonal corners (unnumbered) of the panel-retention frame.

The telescoping nature of the guideway 40 permits the length of the guideway 40 to be adjusted to fit differently sized panel-retention frames.

The guideway 40 may include one or more rails (not separately numbered) having substantially any desired cross-sectional shape including circular, oval, square, rectangular, rhombus, rhomboidal, trapezoidal, hexagonal, etc. When the guideway 40 includes a single rail, the first section 40a of the guideway 40 preferably has a flat top 43 in order to provide a sturdy support area for the self-leveling laser 70.

The self-leveling laser 70 is securely attached to the upper surface 61 of a mounting sleeve 60 which slidably engages the first section 40a of the guideway 40. The self-leveling laser 70 may be quickly and easily repositioned along the length of the first section 40a of the guideway 40 by simply sliding the mounting sleeve 60 along the first section 40a of the guideway 40.

The mounting sleeve 60 may be equipped with locking mechanism, such as a quick release clamp (not shown) or a set screw (not shown), for releasably locking the sleeve 60 into a given position on the first section 40a of the guideway 40.

Other means for repositionably mounting the self-leveling laser 70 onto the first section 40a of the guideway 40 are known to those skilled in the art and may be used instead of a mounting sleeve 60.

The mounting sleeve 60 may include a side window 69 and an alignment indicator 68 for permitting viewing of a ruler (not shown) or other similar indicia (such as a center marking 44) on the side of the first section 40a of the guideway 40 for facilitating precise reproducible positioning of the laser 70 along the longitudinal length x of the guideway 40.

The tool 10 may further be equipped with a cooperative combination of a longitudinally x aligned dimple 49 in the first section 40a of the guideway 40 and a detent 65 on the mounting sleeve 60 for providing modest resistance to further longitudinal x movement of the mounting sleeve 60 relative to the guideway 40 when the laser 70 is positioned at a commonly used location for placement of a fire sprinkler head 340 (e.g., ¼ or ½ points along the diagonal of a 2' by 2' panel 220, or the ¼ or ½ points along the diagonal of a 2' by 4' panel 220, etc.).

The self-leveling laser 70 is capable of leveling itself relative to gravity and generating a plumb laser beam 70b when leveled. A power switch 71 is provided on the laser 70.

Use

Figure 6:
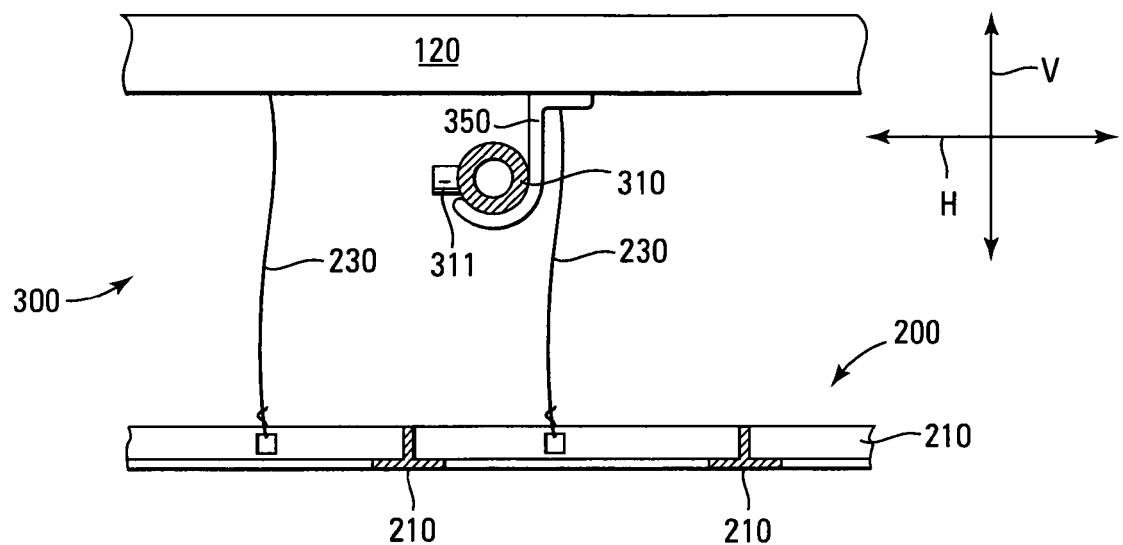
FIG. 6 is a side view of the upper portion of the room depicted in FIGS. 4 and 5.
Figure 7:
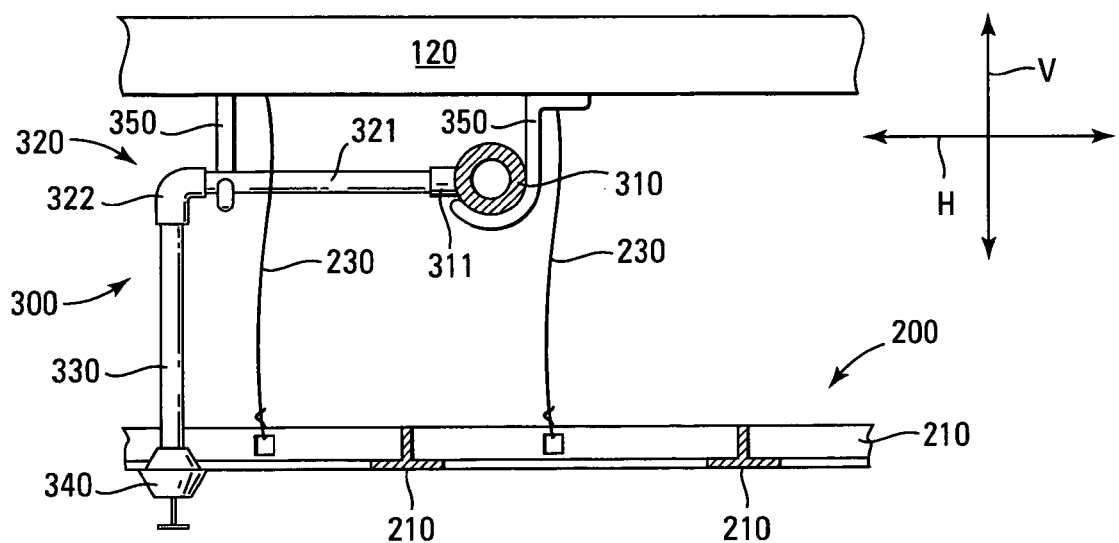
FIG. 7 is a side view of the upper portion of the room depicted in FIG. 6 after installation of a fire sprinkler head.

Referring generally to FIGS. 3-7, the tool 10 is used to precisely locate and install fire sprinkler heads 340 in a suspended ceiling 200 within a room 100 defined by interior and/or exterior walls 110. The method includes the steps of (i) obtaining the tool 10, (ii) identifying at least one panel-retention frame in an installed suspended ceiling 200 grid system within which a fire sprinkler head 340 is to be located, (iii) resting the tool 10 within the identified frame by (–) adjusting the longitudinal x length of the guideway 40 as necessary to fit the tool 10 within the frame, (–) resting the first foot 31 of the tool 10 upon the support beams 210 forming one corner (unnumbered) of the frame, and (–) resting the second foot 32 of the tool 10 upon the support beams 210 forming a diagonal corner (unnumbered) of the frame, (iv) positioning the laser 70 along the longitudinal x length of the guideway 40 at the desired horizontal location for the fire sprinkler head 340, (v) projecting a plumb laser beam 70b upward from the positioned laser 70, (vi) measuring horizontal distance from an attachment point 311 on a previously installed overhead piping system (e.g., a T-joint 311 on a previously installed main pipe 310 as shown in FIG. 6) to the laser beam 70b, (vii) creating a piping assembly 320 (e.g., a horizontal length of pipe 321 and a 90° elbow 322 as shown in FIG. 7) based upon the measured horizontal distance from the attachment point 311 to the laser beam 70b, (viii) connecting a first end (unnumbered) of the piping assembly 320 to the previously installed overhead piping system at the attachment point 311 from which the measurement was taken, (ix) removing the tool 10 from within the identified panel-retention frame, and (x) connecting a second end (unnumbered) of the piping assembly 320 to a vertical length of pipe 330 configured and arranged to extend plumb from the second end of the piping assembly 320 to a fire sprinkler head 340 positioned below a ceiling panel 220 installed within the identified panel-retention frame.

As shown in FIGS. 6 and 7, wire hangers 230 are employed to attach the support beams 210 of a suspended ceiling 200 to the ceiling joists 120 and hangers 350 are employed to anchor the piping to the ceiling joists 120. Wire suitable for use in forming the wire hangers 230 is available wherever suspended ceiling supplies are sold. Suitable hangers 350 are readily available from most supply stores.

I claim:

1. A tool for projecting a visually perceptible plumb line extending from a proposed location of a fire sprinkler head on a suspended ceiling with the suspended ceiling including at least (–) a system of support beams forming a suspended ceiling grid system with at least one rectangular panel-retention frame, and (–) ceiling panels, comprising:
    (a) a base including at least a longitudinally extending guideway having a first end and a second end, and a foot proximate each longitudinal end of the guideway configured and arranged to supportably engage the support beams of an installed suspended ceiling grid system proximate diagonal corners of a rectangular panel-retention frame defined by the support beams, and
    (b) a self-leveling laser repositionably mounted on the base capable of projecting a vertically extending plumb laser beam.

2. The tool of claim 1 wherein the laser is repositionably mounted upon the guideway, and the guideway and laser are configured and arranged such that when the laser is mounted upon the guideway and the tool is placed within the rectangular panel-retention frame, the laser beam will project upward from a point along a diagonal line defined by the rectangular panel-retention frame.

3. The tool of claim 1 wherein the tool includes a centering means for perceptibly indicating when the laser is positioned upon the guideway such that the laser beam extends from the center of the panel-retention frame within which the tool is placed.

4. The tool of claim 3 wherein the centering means comprises indicia upon the base and the laser which, when aligned, position the laser beam at the center of the panel-retention frame within which the tool is placed.

5. The tool of claim 3 wherein the centering means comprises a detent which provides modest resistance to further movement of the laser along the guideway when the laser is positioned with the laser beam at the center of the panel-retention frame within which the tool is placed.

6. A method for installing fire sprinkler heads in a suspended ceiling, with the suspended ceiling including at least (–) a system of support beams forming a suspended ceiling grid system with at least one rectangular panel-retention frame having diagonal corners, and (–) ceiling panels, comprising:
    (a) obtaining a tool comprising:
        (i) including at least a longitudinally extending guideway having a first end and a second end, and a foot proximate each longitudinal end of the guideway configured and arranged to supportably engage the support beams of an installed suspended ceiling grid system proximate diagonal corners of the rectangular panel-retention frame defined by the support beams, and
        (ii) a self-leveling laser repositionably mounted on the base capable of projecting a vertically extending plumb laser beam,
    (b) identifying the at least one panel-retention frame in the installed grid system where the fire sprinkler head is to be located,
    (c) resting the tool within the identified panel-retention frame with the foot proximate each of the first and second ends of the guideway stably positioned at diagonal corners of the identified panel-retention frame,
    (d) positioning the laser on the base at the desired horizontal location for the fire sprinkler head,
    (e) projecting a plumb laser beam upward from the positioned laser,
    (f) measuring horizontal distance from an attachment point on a previously installed overhead piping system to the laser beam,
    (g) creating a piping assembly configured and arranged to horizontally extend from the attachment point from which the measurement was taken to a position immediately over the desired location for the fire sprinkler head,
    (h) connecting a first end of the piping assembly to the previously installed overhead piping system at the attachment point from which the measurement was taken,
    (i) removing the tool from within the identified panel-retention frame, and
    (j) connecting a second end of the piping assembly to a length of piping configured and arranged to extend plumb from the second end of the piping assembly to the fire sprinkler head positioned below a ceiling panel installed within the identified panel-retention frame.

7. The method of claim 6 further comprising repeating steps (c) through (j) for a second panel-retention frame in the installed grid system where a second fire sprinkler head is to be located.

8. The method of claim 6 wherein the piping assembly comprising (–) a straight length of pipe having a first end and a second end, (–) a fitting at the first end of the pipe effective for sealed connection to the previously installed overhead piping system at the attachment point from which the measurement was taken, and (–) a 90° elbow sealingly connected to the second end of the pipe.

9. The method of claim 6 further comprising the step of anchoring the piping assembly to a ceiling joist or cross-beam proximate the second end of the piping assembly.

10. The method of claim 6 wherein the laser is repositionably mounted upon the guideway, and the guideway and laser are configured and arranged such that when the laser is mounted upon the guideway and the tool is placed within the rectangular panel-retention frame, the laser beam will project upward from a point along a diagonal line defined by the rectangular panel-retention frame.

11. The method of claim 6 wherein the tool includes a centering means for perceptibly indicating when the laser is positioned upon the guideway such that the laser beam extends from the center of the panel-retention frame within which the tool is placed.

12. The method of claim 11 wherein the centering means comprises indicia upon the base and the laser which, when aligned, position the laser beam at the center of the panel-retention frame within which the tool is placed.

13. The method of claim 11 wherein the centering means comprises a detent which provides modest resistance to further movement of the laser along the guideway when the laser is positioned with the laser beam at the center of the panel-retention frame within which the tool is placed.

* * * * *